(12) United States Patent
Nayak

(10) Patent No.: US 10,708,725 B2
(45) Date of Patent: Jul. 7, 2020

(54) AUTOMATED TEXT-TO-SPEECH CONVERSION, SUCH AS DRIVING MODE VOICE MEMO

(71) Applicant: T-Mobile USA, Inc., Bellevue, WA (US)

(72) Inventor: Niraj Nayak, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/424,731

(22) Filed: Feb. 3, 2017

(65) Prior Publication Data
US 2018/0226075 A1   Aug. 9, 2018

(51) Int. Cl.
| | | |
|---|---|---|
| *G10L 13/00* | (2006.01) | |
| *H04W 4/12* | (2009.01) | |
| *G10L 13/04* | (2013.01) | |
| *H04M 1/725* | (2006.01) | |
| *G10L 13/047* | (2013.01) | |

(52) U.S. Cl.
CPC ............... *H04W 4/12* (2013.01); *G10L 13/00* (2013.01); *G10L 13/04* (2013.01); *G10L 13/043* (2013.01); *G10L 13/047* (2013.01); *H04M 1/72563* (2013.01); *H04M 1/72569* (2013.01)

(58) Field of Classification Search
None
See application file for complete search history.

(56) References Cited

U.S. PATENT DOCUMENTS

| | | | | |
|---|---|---|---|---|
| 7,650,170 | B2 * | 1/2010 | May | H04M 1/6066 379/420.04 |
| 8,165,881 | B2 * | 4/2012 | Kirsch | B60R 16/0373 704/260 |
| 8,554,254 | B2 * | 10/2013 | May | H04M 1/6066 455/466 |
| 9,196,239 | B1 * | 11/2015 | Taylor | G06F 3/017 |
| 9,361,062 | B2 * | 6/2016 | Jeon | H04M 1/7253 |
| 9,544,853 | B1 * | 1/2017 | Gu | H04W 52/0261 |
| 2010/0049515 | A1 * | 2/2010 | Sumiyoshi | G10L 15/22 704/246 |
| 2010/0057465 | A1 * | 3/2010 | Kirsch | G01C 21/3629 704/260 |
| 2011/0173002 | A1 * | 7/2011 | Fujii | B60R 16/0373 704/246 |

(Continued)

OTHER PUBLICATIONS

M. Aylett, "The future of voice synthesis after WaveNet", thestack.com, Sep. 13, 2016.*

*Primary Examiner* — Richard Z Zhu

(74) *Attorney, Agent, or Firm* — Perkins Coie LLP

(57) ABSTRACT

Various embodiments generally relate to systems and methods for creation of voice memos while an electronic device is in a driving mode. In some embodiments, a triggering event can be used to indicate that the electronic device is within a car or about to be within a car and that text communications should be translated (e.g., via an application or a conversion platform) into a voice memo that can be played via a speaker. These triggering events can include a manual selection or an automatic selection based on a set of transition criteria (e.g., electronic device moving above a certain speed, following a roadway, approaching a location in a map of a marked car, etc.).

18 Claims, 7 Drawing Sheets

(56) References Cited

U.S. PATENT DOCUMENTS

| | | | |
|---|---|---|---|
| 2011/0257973 A1* | 10/2011 | Chutorash | G01C 21/3661 704/235 |
| 2012/0001843 A1* | 1/2012 | Gravino | G06F 1/1694 345/156 |
| 2016/0266872 A1* | 9/2016 | Jeon | H04M 1/7253 |

* cited by examiner

AUTOMATED TEXT-TO-SPEECH CONVERSION, SUCH AS DRIVING MODE VOICE MEMO

BACKGROUND

Modern communication networks and electronic devices have changed the way individuals in society interact and communicate. These devices increasingly provide advanced computing capabilities along with a variety of other features and options that improve the user's experience with the device. Some common examples of the features and options include e-mail, cameras, Wi-Fi, SMS and MMS messaging, web browsers, voice/video calling, image and video capturing, and GPS capabilities. In addition to these common features and options, modern electronic devices often include operating systems that can run software applications on one or more processors. The software applications can be installed (e.g., by the manufacturer, mobile carrier, or by the user) on these devices to perform a variety of specific tasks and/or extend the functionality of the devices.

As these networks and devices have evolved so has the ease at which users interact with the features and options. However, the use of these features can be distracting as users look at the screen. This can be particularly unsafe during a variety of activities, such as, driving. For example, users of these electronics devices will often look at the screen of an electronic device to use e-mail, read or send an SMS message, surf the web browsers, enter destinations, and/or use other features while driving. As a result, new techniques are needed to provide users of these electronic devices better ways to interact with the electronic devices without the need to look at the screen when their attention is needed to perform another activity.

BRIEF DESCRIPTION OF THE DRAWINGS

Embodiments of the present technology will be described and explained through the use of the accompanying drawings in which.

Figure 1:
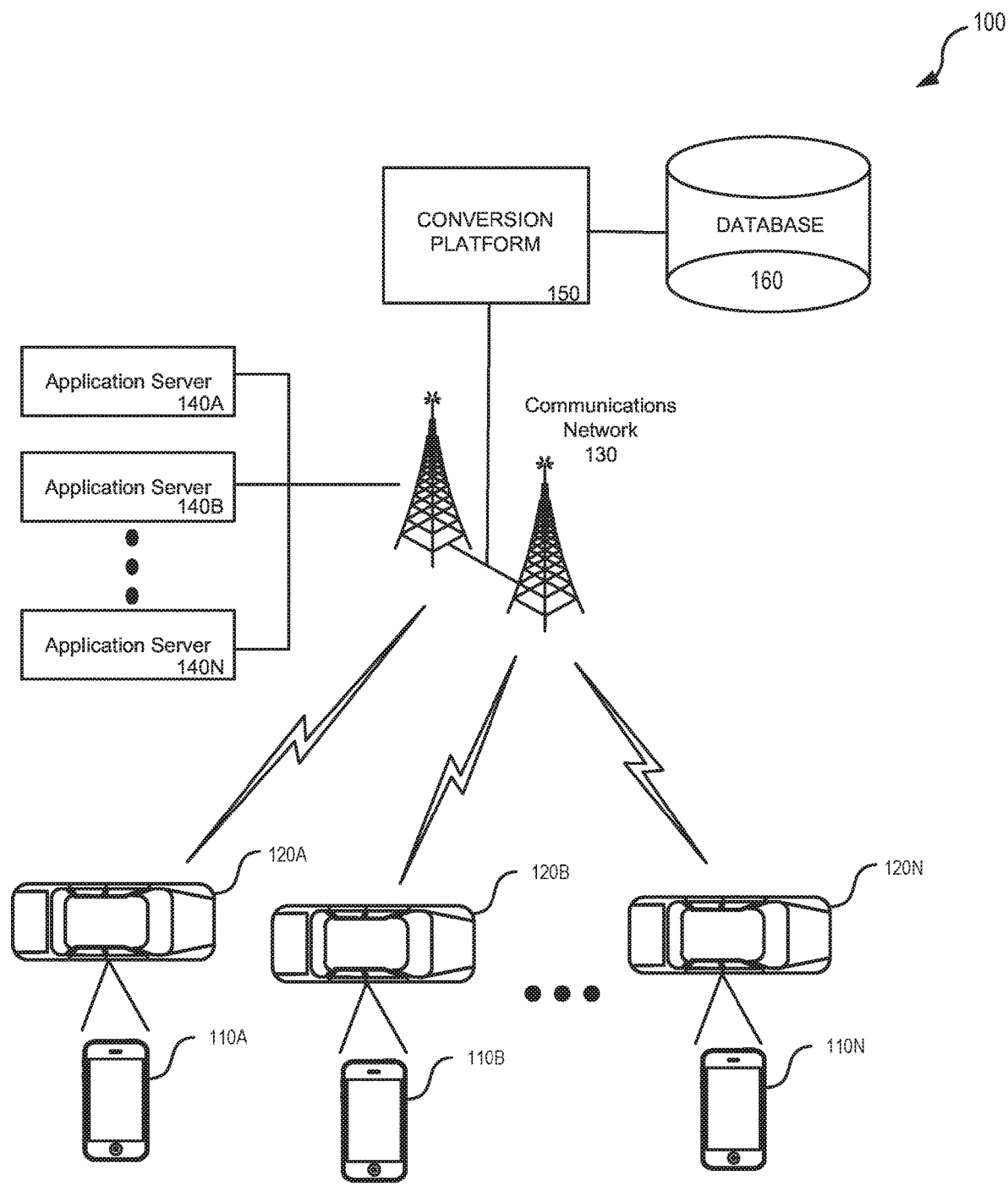
FIG. 1 illustrates an example of a communications environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments generally relate to systems and methods for creation of voice memos while an electronic device is in a driving mode. Traditionally, when a user of an electronic device gets an email via an e-mail account (e.g., Yahoo, Outlook, Gmail, etc.), that e-mail will pop-up on the electronic device's screen (with or without sound notification) based on the notification settings set for that account. With this notification a user can only see the sender and the subject of the e-mail received on the electronic device. If a user wants to check body/content of the e-mail, then the user typically needs to unlock the electronic device and then has to manually go to that e-mail account to review the message. As such, the process involved in trying to review the contents of an e-mail body while driving is very risky as it may distract a user from driving and may result in an accident.

Various embodiments allow for the monitoring of a triggering event to indicate that the electronic or mobile device is within a car or about to be within a car. These triggering events can include a manual selection or an automatic selection based on a set of transition criteria (e.g., electronic device moving above a certain speed, following a roadway, approaches a location in a map of a marked car, etc.). For example, before a user starts driving a car, the user can manually place the electronic device in a driving mode. In an embodiment, e-mail and text message notifications are disabled by default while the electronic device is in driving mode, thereby preventing the display of e-mail or text messages on the electronic device while driving mode is active. Similarly, the electronic device may use a set of sensors and transition logic to automatically transition from a non-driving mode to a driving mode without any input from the user.

In accordance with various embodiments, the driving mode can enable the conversion of all (or a selected group) of the incoming messages (e.g., SMS messages, e-mails, push notifications, etc.) to a voice memo. The voice memo can then be played via a speaker thereby allowing the user to listen to the message while driving without getting distracted from driving. In some embodiments, the voice memo can include details like, but not limited to, the following: 1) who is the sender; 2) who are in the "To" field list; 3) the contents of the subject line; 4) the contents of the body of the e-mail or message; 5) timing of the message (e.g., e-mail); and/or the like. Various embodiments allow the user to customize the contents of the voice memo as well as create conversion criteria for which messages can be converted to a voice memo.

Some embodiments allow a user to reply/send a response using the same or different communication channel (e.g., e-mail) by inserting a voice memo which is then converted to text and sent to a desired recipient. The user may also want to review the voice memo, modify the list in one or more fields (e.g., the "To" field, the "Cc" field, the "Bcc" field, etc.) before the voice memo is converted to the message (e.g., e-mail text).

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to conversion of messages to voice memos, embodiments of the present technology are equally applicable other conversions and notifications in response to incoming messages.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a communications environment 100 in which some embodiments of the present technology may be utilized. As illustrated in FIG. 1, communications environment 100 may include one or more electronic devices 110A-110N (such as a mobile phone, tablet computer, mobile media device, vehicle-based computer, wearable computing device, etc.), vehicles 120A-120N, communications network 130, application servers 140A-140N, conversion platform 150 and database 160.

Electronic devices 110A-110N can include network communication components that enable the electronic devices to communicate with remote application servers 140A-140N, conversion platform 150, and/or other portable electronic devices by transmitting and receiving wireless signals using licensed, semi-licensed or unlicensed spectrum over communications network 130. In some cases, communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in electronic devices 110A-110N to enable network communication. For example, an electronic device may be configured to communicate over a GSM mobile telecommunications network. As a result, the electronic device may include a Subscriber Identity Module (SIM) card that stores an International Mobile Subscriber Identity (IMSI) number that is used to identify the mobile device on the GSM mobile communications network or other networks, for example, those employing 3G, 4G, and/or 5G wireless protocols. If the electronic device is configured to communicate over another communications network, the electronic device may include other components that enable it to be identified on the other communications networks.

In some embodiments, electronic devices 110A-110N may include components that enable them to connect to a communications network using Generic Access Network (GAN) or Unlicensed Mobile Access (UMA) standards and protocols. For example, an electronic device may include components that support Internet Protocol (IP)-based communication over a Wireless Local Area Network (WLAN) and components that enable communication with the telecommunications network over the IP-based WLAN. Electronic devices 110A-110N may include one or more sensors and/or applications that need to transfer data or check-in with application servers 140A-140N, and/or conversion platform 150.

In some embodiments, an owner of an electronic device can subscribe (e.g., register and/or pay a fee) to a conversion service that is provided by conversion platform 150 and/or an application running on the electronic device. Electronic devices 110A-110N can monitor for various triggering events. In response to detecting a triggering event, electronic devices 110A-110N can be placed in a driving mode. While in the driving mode written messages received, for example, via e-mail, text messaging, and the like can be converted into a voice memo which is played via a speaker of the electronic device or an external speaker system such as in vehicle 120A-120N.

In some embodiments, the electronic devices 110A-110N can send a message to application server 140A-140N and/or conversion platform 150 via communications network 130. Conversion platform 150 can access database 160 to lookup a set of conversion rules for electronic device 110A-110N and/or user. These rules can identify how various communication conversions should be handled and delivered to the subscriber and/or other third-parties. In some embodiments, conversion platform 150 (and/or a conversion application running on an electronic device) may transcribe to text in the sender's language, then transcribe into the recipient's desired language. Also, a text-to-speech conversion could be done by electronic devices 110A-110N, or via a server in the network.

Figure 2:
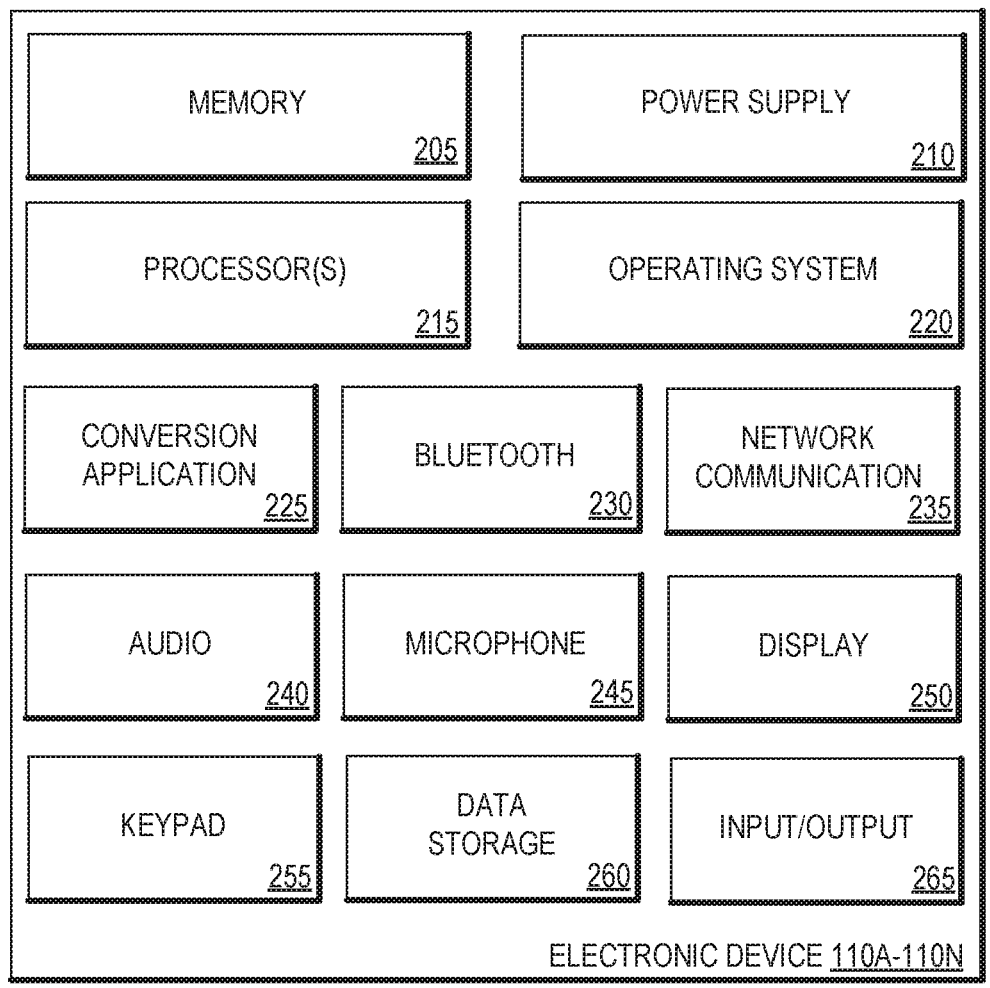
FIG. 2 illustrates a set of components within an electronic device according to one or more embodiments of the present technology.

FIG. 2 illustrates a set of components of an electronic device 110A-110N according to one or more embodiments of the present technology. As shown in FIG. 2, electronic device 110A-110N may include memory 205 (e.g., volatile memory and/or nonvolatile memory), power supply 210 (e.g., battery), processor(s) 215 for executing processing instructions, and operating system 220. Additional components and applications such as conversion application 225, one or more network interfaces (e.g., Bluetooth Interface 230; and Network Communication Interface 235, which enables the electronic device to communicate by transmitting and receiving wireless signals using licensed, semi-licensed or unlicensed spectrum over a telecommunications network), audio interface 240, microphone 245, display 250, keypad or keyboard 255, data storage 260 (e.g., hard drive, flash memory, memory card, etc.), and other input and/or output interfaces 265. The various components of the electronic device may be interconnected via a bus.

Processor(s) 215 are the main processors of electronic device 110A-110N which may include application processors, baseband processors, various coprocessors, and other dedicated processors for operating electronic device 110A-110N. For example, an application processor can provide the processing power to support software applications, memory management, graphics processing, and multimedia. An application processor may be communicably coupled with memory 205 and configured to run the operating system, the user interface, and the applications stored on memory 205 or data storage component 260. A baseband processor may be configured to perform signal processing and implement/manage real-time radio transmission operations of electronic device 110A-110N. These processors along with the other components may be powered by power supply 210. The volatile and nonvolatile memories found in various embodiments may include storage media for storing information such as processor-readable instructions, data structures, program modules, or other data. Some examples of information that may be stored include basic input/output systems (BIOS), operating systems, and applications.

Figure 3:
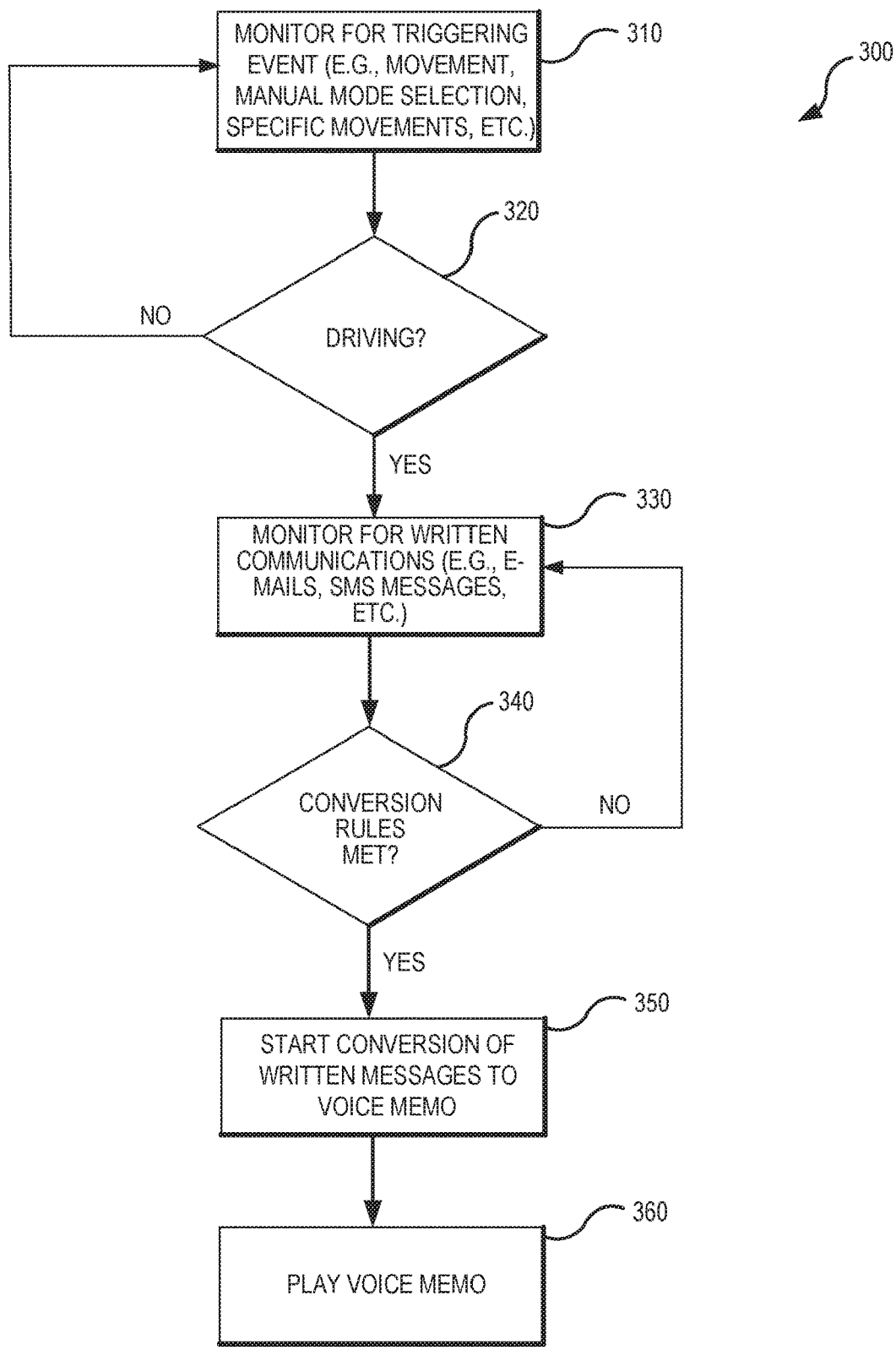
FIG. 3 is a flowchart illustrating a set of operations for automatically generating and playing a voice memo in accordance with some embodiments of the present technology.

FIG. 3 is a flowchart illustrating a set of operations 300 for automatically generating and playing a voice memo in accordance with some embodiments of the present technology. As illustrated in FIG. 3, monitoring operation 310 monitors for a triggering event. In accordance with various embodiments, the triggering event can include a manual indication from a user or an automated determination. For example, the automated determination in some embodiments can include a connection (e.g., via Bluetooth) with a vehicular audio system, specific movements (e.g., moving above a threshold speed), movements along a roadway, based on positional information (e.g., where a car was parked), and/or the like.

Using this information, determination operation 320 determines whether or not to place the electronic device into a driving mode. When determination operation 320 determines that the electronic device should not be placed in driving mode, determination operation 320 branches to monitoring operation 310. When determination operation 320 determines that the electronic device should be placed in driving mode, determination operation 320 branches to communication operation 330 to monitor for messages such as, but not limited to, e-mails, SMS messages, push notifications, written communications and/or other messages that may require interaction from the user to read.

Conversion operation 340 determines if the message meets any conversion rules. The conversion rules, for example, may indicate that all messages should be converted to voice memos. Other conversion rules may restrict the conversion to certain types of messages (e.g., only e-mail or text messages), from certain recipients, from certain applications (e.g., from Gmail only), and/or the like. The rules may be static or may change depending on the amount of time the electronic device is in the driving mode. As one example, a user may set the conversion rules to only convert written e-mails from specific people when the driving mode has been activated less than a specific period of time (e.g., only after the user was driving for ten minutes). Beyond this specific period of time the user may request that other messages be converted to a voice memo (e.g., all work e-mails or certain text messages). Various embodiments allow for multiple time periods and/or conditions (e.g., location based, based on estimated navigational arrival time, etc.) for setting the conversion rules.

When conversion operation 340 determines that the conversion rules are not met, then conversion operation 340 branches to monitoring operation 330 to monitor for additional messages. When conversion operation 340 determines that the conversion rules have been met, then conversion operation 340 branches to transcription operation 350 where the messages are translated into voice memos. The voice memos can include a variety of information, metadata or tags about the original message. This information can include, but is not limited to, the application, the sender, the recipient list, time stamp, and/or other information. Moreover, the transcription of the messages into voice memos may be done locally by the electronic device and/or remotely (e.g., via conversion platform 150 shown in FIG. 1). Where the conversion happens may be based on a variety of factors, such as but not limited to, length of the message, strength of cellular signal, battery life, number of messages to be translated, user preferences, and/or other factors. For example, messages below a certain threshold may be translated locally when sufficient battery life and signal strength are available. Once the messages have been converted to voice memos, listen operation 360 plays the voice memo allowing the user to review the contents while minimizing visual distractions.

Figure 4:
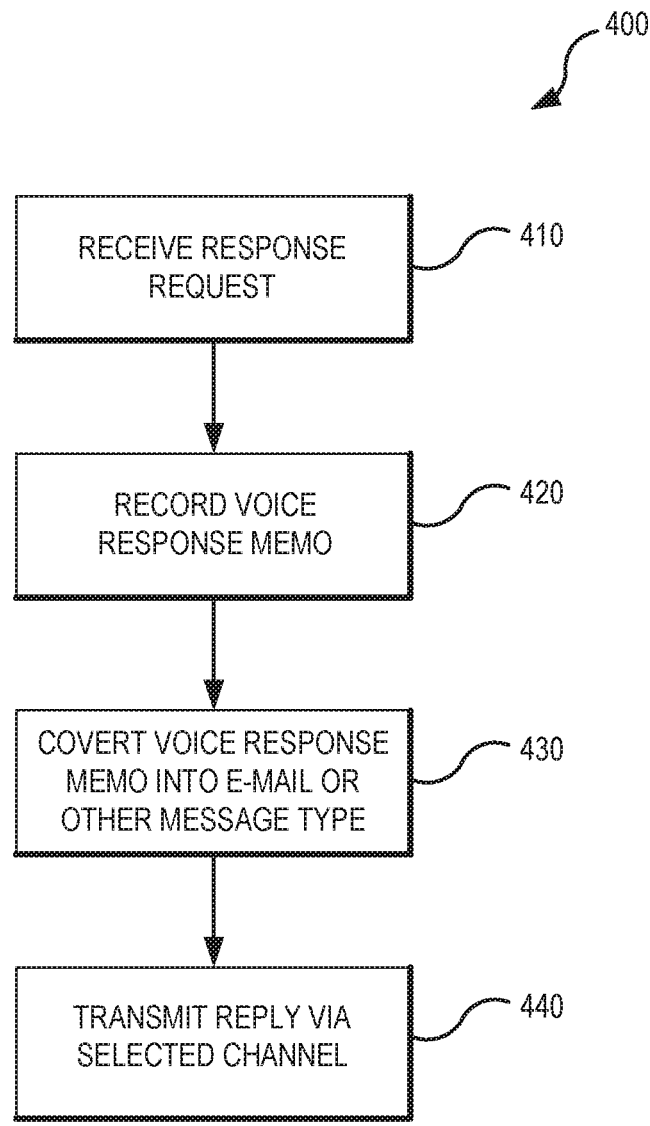
FIG. 4 is flowchart illustrating a set of operations for replying to a voice memo in accordance with various embodiments of the present technology.

FIG. 4 is flowchart illustrating a set of operations 400 for replying to a voice memo in accordance with various embodiments of the present technology. As illustrated in FIG. 4, receiving operation 410 receives a response request to reply to a voice memo. The response may be received, in accordance with various embodiments, via controls on a steering wheel of a vehicle, one or more voice commands, visually recognized gestures, and/or the like. The user may be guided through a response menu that allows them to select (e.g., via gestures, voice commands, etc.) various response options such as the response channel (e.g., e-mail, SMS, etc.), recipients, delivery time, and/or the like. Once the response options have been selected, recordation operation 420 records the voice memo which is then translated using conversion operation 430 into a written response message. The written response message can then be transmitted to one or more recipients via one or more selected channels.

Figure 5:
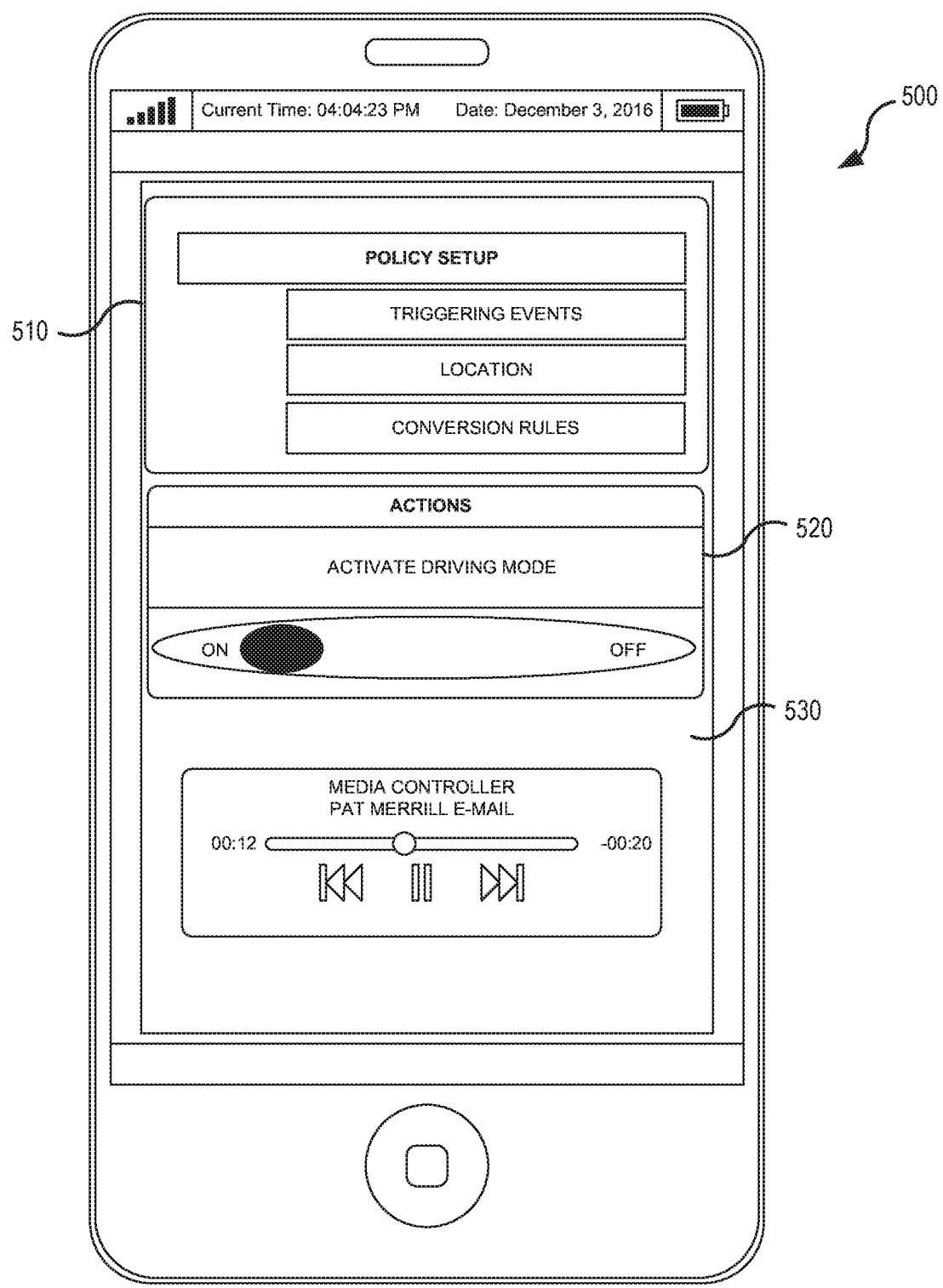
FIG. 5 is an example of a graphical user interface that may be used in accordance with some embodiments of the present technology.

FIG. 5 is an example of a graphical user interface 500 that may be used in accordance with some embodiments of the present technology. In accordance with various embodiments, graphical user interface 500 may be part of a stand-alone application, accessed via a thin client, deployed via the cloud, or even integrated at the operating system level. The graphical user interface may be displayed in response to a request from a user, detection of a triggering event, and/or other condition.

As illustrated in FIG. 5, graphical user interface 500 can include policy setup bar 510 that can allows a user of an electronic device to setup policies and/or modify policies. These policies can include items such as the triggering events, location rules, conversion rules, and/or the like. The conversion rules, for example, may indicate that all written messages should be converted to voice memos. Other conversion rules may restrict the conversion to certain types of written messages (e.g., only e-mail or text messages), from certain recipients, from certain applications (e.g., from Gmail only), and/or the like.

The conversion rules may be static or may change depending on the amount of time the electronic device is in the driving mode. As one example, a user may set the conversion rules to only convert written e-mails from specific people when the driving mode has been activated less than a specific period of time (e.g., ten minutes). Beyond this specific period of time the user may request that other written messages be converted to a voice memo (e.g., all work e-mails or certain text messages). Various embodiments allow for multiple time periods and/or conditions (e.g., location based, based on estimated navigational arrival time, etc.) for setting the conversion rules.

In addition to policy setup, graphical user interface 500 may include an action bar 520 that allows a user to manually activate or deactivate driving mode. Graphical user interface may include a visual media controller 530 identifying the message and providing manual controls.

Figure 6:
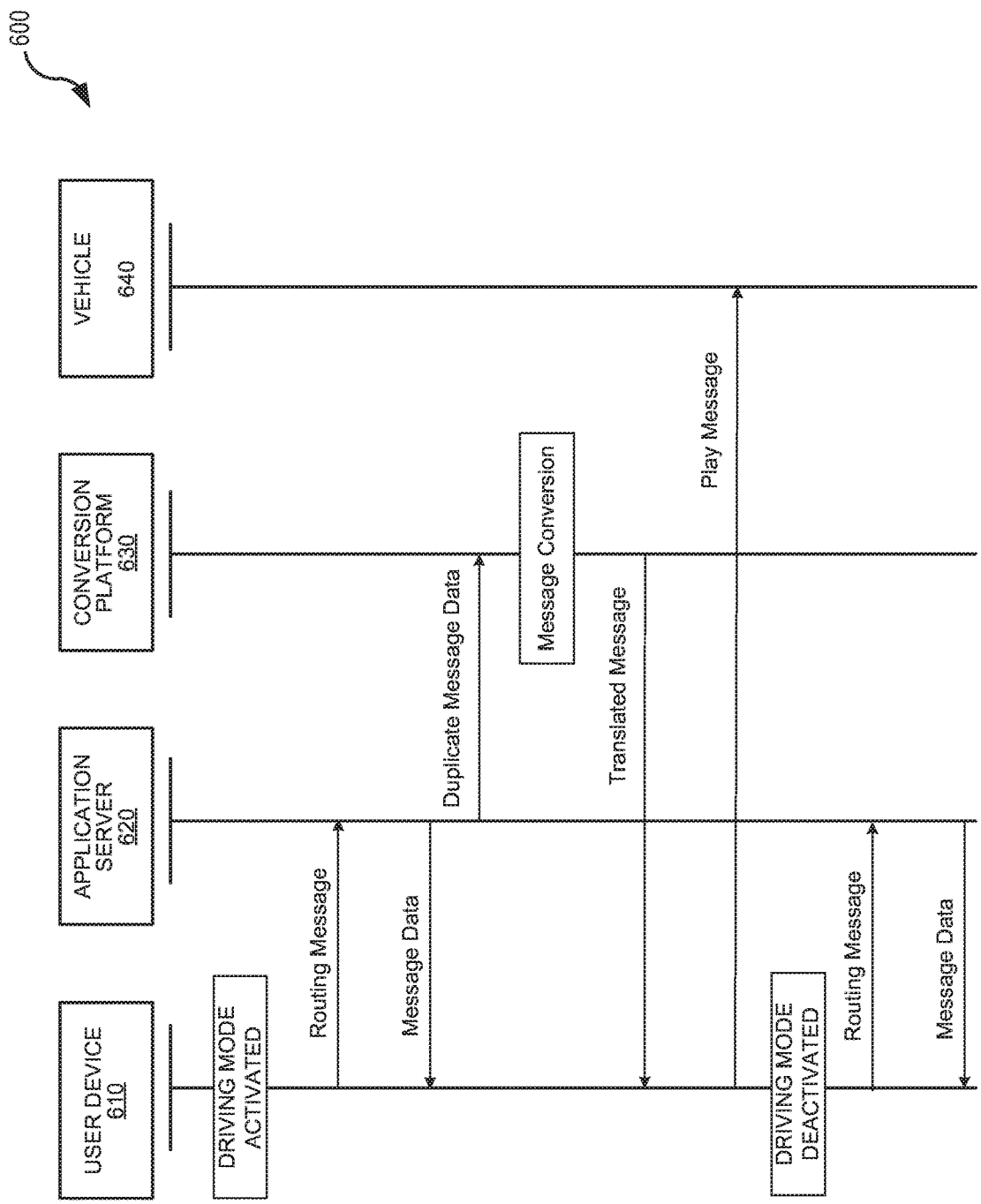
FIG. 6 is an example of a sequence diagram illustrating communications between various components that may be used in accordance with one or more embodiments of the present technology.

FIG. 6 is an example of a sequence diagram 600 illustrating communications between various components that may be used in accordance with one or more embodiments of the present technology. As illustrated in FIG. 6, user device 610 can move between a driving mode and a non-driving mode. When the user device is in a driving mode, a routing message can be sent to application server 620. In some embodiments, the routing message configures the application server to send future messages to user device 610 and a duplicate message to conversion platform 630. When the message is received at conversion platform 630, the message can be translated into a voice memo and then transmitted to user device 610. Upon receiving the voice memo, user device 610 can play the message (e.g., using a Bluetooth connection to vehicle 640). When the user device switched back to a normal driving mode, an updated routing message can be sent to application server 620 so that any future messages are just sent to user device 610 and not conversion platform 630.

Exemplary Computer System Overview

Aspects and implementations of the voice memo conversion system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 7:
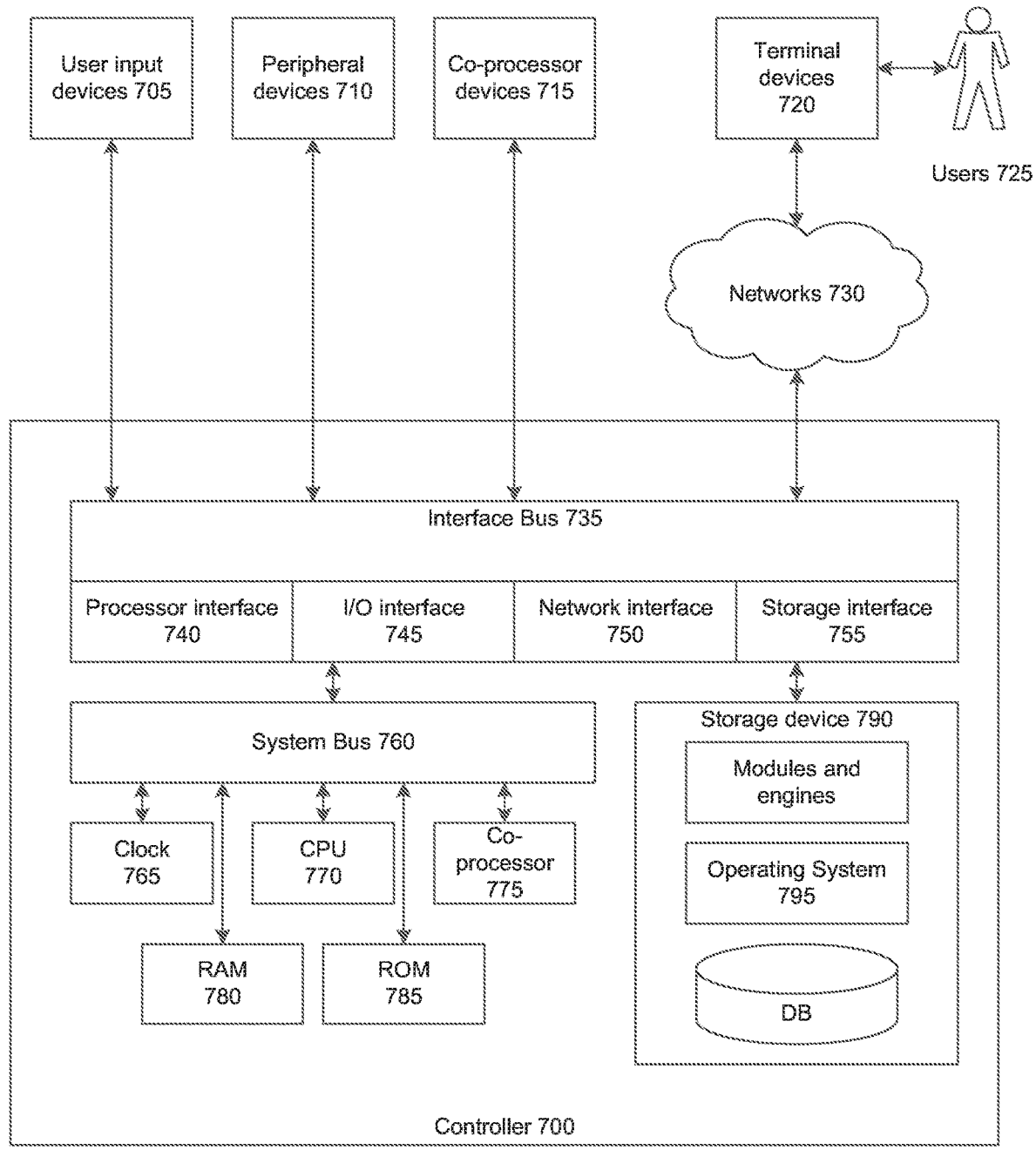
FIG. 7 is a block diagram illustrating a computer systemization according to various embodiments of the present technology.

FIG. 7 is a block diagram illustrating an example machine representing the computer systemization of the conversion system. The conversion controller 700 may be in communication with entities including one or more users 725, client/terminal/IoT devices 720 (e.g., devices 110A-110N), user input devices 705, peripheral devices 710, an optional co-processor device(s) (e.g., cryptographic processor devices) 715, and networks 730 (e.g., 120 in FIG. 1). Users may engage with the controller 700 via terminal devices 720 over networks 730.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 700 may include clock 765, CPU 770, memory such as read only memory (ROM) 785 and random access memory (RAM) 780 and co-processor 775 among others. These controller components may be connected to a system bus 760, and through the system bus 760 to an interface bus 735. Further, user input devices 705, peripheral devices 710, co-processor devices 715, and the like, may be connected through the interface bus 735 to the system bus 760. The interface bus 735 may be connected to a number of interface adapters such as processor interface 740, input output interfaces (I/O) 745, network interfaces 750, storage interfaces 755, and the like.

Processor interface 740 may facilitate communication between co-processor devices 715 and co-processor 775. In one implementation, processor interface 740 may expedite encryption and decryption of requests or data. Input output interfaces (I/O) 745 facilitate communication between user input devices 705, peripheral devices 710, co-processor devices 715, and/or the like and components of the controller 700 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 750 may be in communication with the network 730. Through the network 730, the controller 700 may be accessible to remote terminal devices 720. Network interfaces 750 may use various wired and wireless connection protocols such as, direct connect, Ethernet, wireless connection such as IEEE 802.11a-x, and the like.

Examples of network 730 include the Internet, Local Area Network (LAN), Metropolitan Area Network (MAN), a Wide Area Network (WAN), wireless network (e.g., using Wireless Application Protocol WAP), a secured custom connection, and the like. The network interfaces 750 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 755 may be in communication with a number of storage devices such as, storage devices 790, removable disc devices, and the like. The storage interfaces 755 may use various connection protocols such as Serial Advanced Technology Attachment (SATA), IEEE 1394, Ethernet, Universal Serial Bus (USB), and the like.

User input devices 705 and peripheral devices 710 may be connected to I/O interface 745 and potentially other interfaces, buses and/or components. User input devices 705 may include card readers, finger print readers, joysticks, keyboards, microphones, mouse, remote controls, retina readers, touch screens, sensors, and/or the like. Peripheral devices 710 may include antenna, audio devices (e.g., microphone, speakers, etc.), cameras, external processors, communication devices, radio frequency identifiers (RFIDs), scanners, printers, storage devices, transceivers, and/or the like. Co-processor devices 715 may be connected to the controller 700 through interface bus 735, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 700 may employ various forms of memory including on-chip CPU memory (e.g., registers), RAM 780, ROM 785, and storage devices 790. Storage devices 790 may employ any number of tangible, non-transitory storage devices or systems such as fixed or removable magnetic disk drive, an optical drive, solid state memory devices and other processor-readable storage media. Computer-executable instructions stored in the memory may include the conversion platform 150 having one or more program modules such as routines, programs, objects, components, data structures, and so on that perform particular tasks or implement particular abstract data types. For example, the memory may contain operating system (OS) component 795, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 700 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 700 may be distributed electronically over the Internet or over other networks (including wireless networks). Those skilled in the relevant art(s) will recognize that portions of the conversion system may reside on a server computer, while corresponding portions reside on a client computer. Data structures and transmission of data particular to aspects of the controller 700 are also encompassed within the scope of the disclosure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for operating an electronic device, the method comprising:
   monitoring the electronic device to identify a triggering event that triggers a certain mode of operation of the electronic device,
      wherein the triggering event includes a determination that the electronic device is proximate to a vehicle associated with the electronic device;
   transitioning, the electronic device into a driving mode of operation in response to the triggering event,
      wherein the driving mode of operation of the electronic device causes the electronic device to convert message-based communications received by the electronic device into voice memos;
   receiving one or more text messages via a wireless network in communication with the electronic device;
   accessing a set of conversion rules associated with converting message-based communications during the driving mode of operation of the electronic device,
      wherein the conversion rules identify a first time period during the driving mode of operation within which text messages are to be converted to voice memos and identify a second time period during the driving mode of operation within which text messages are not to be converted to voice memos;
   determining, based on the accessed conversion rules, to convert at least one of the received one or more text messages into a voice memo because the at least one of the received one or more text messages was received within the first time period during the driving mode of operation; and
   causing the voice memo to be output via a speaker of the electronic device or a speaker of the vehicle associated with the electronic device.

2. The method of claim 1, further comprising:
   receiving, via a microphone of the electronic device, a reply request to respond to the voice memo output via the speaker;
   recording, via the microphone, a reply message spoken by a user of the electronic device;
   converting the reply message received via the microphone to a text message; and
   transmitting, via the wireless network, the text message from the electronic device to one or more recipients.

3. The method of claim 1, wherein the electronic device includes a conversion application that uses a processor of the electronic device to apply the set of conversion rules and convert the at least one of the one or more text messages into the voice memo.

4. The method of claim 1, further comprising:
   sending, via the wireless network, the one or more text messages from the electronic device to a network-based conversion platform,
      wherein the network-based conversion platform provides a fee-for-service conversion of text messages to voice memos; and
      wherein the conversion platform applies the set of conversion rules and converts the at least one of the one or more text messages into the voice memo; and
   receiving the voice memo from the network-based conversion platform via the wireless network.

5. The method of claim 1, wherein transitioning to the driving mode of operation includes connecting the electronic device to an external speaker system of the vehicle via a short range communication channel.

6. The method of claim 1, wherein one or more of the accessed conversion rules identifies a sender of text messages to the electronic device to be converted into voice memos.

7. At least one non-transitory, computer-readable medium, carrying instructions, which when executed by at least one data processor, implements instructions for operating an electronic device, the instructions comprising:
   monitoring the electronic device to identify a triggering event that triggers a certain mode of operation of the electronic device,
      wherein the triggering event includes a determination that the electronic device is proximate to a vehicle associated with the electronic device;
   transitioning, the electronic device into a driving mode of operation in response to the triggering event,
      wherein the driving mode of operation of the electronic device causes the electronic device to convert message-based communications received by the electronic device into voice memos;
   receiving one or more text messages via a wireless network in communication with the electronic device;
   accessing a set of conversion rules associated with converting message-based communications during the driving mode of operation of the electronic device,
      wherein the conversion rules identify a first time period during the driving mode of operation within which text messages are to be converted to voice memos and identify a second time period during the driving mode of operation within which text messages are not to be converted to voice memos;
   determining, based on the accessed conversion rules, to convert at least one of the received one or more text messages into a voice memo because the at least one of the received one or more text messages was received within the first time period during the driving mode of operation; and
   causing the voice memo to be output via a speaker of the electronic device or a speaker of the vehicle associated with the electronic device.

8. The computer-readable medium of claim 7, further comprising:
   receiving, via a microphone of the electronic device, a reply request to respond to the voice memo output via the speaker;
   recording, via the microphone, a reply message spoken by a user of the electronic device;
   converting the reply message received via the microphone to a text message; and
   transmitting, via the wireless network, the text message from the electronic device to one or more recipients.

9. The computer-readable medium of claim 7, wherein the electronic device includes a conversion application that uses a processor of the electronic device to apply the set of conversion rules and convert the at least one of the one or more text messages into the voice memo.

10. The computer-readable medium of claim 7, further comprising:
sending, via the wireless network, the one or more text messages from the electronic device to a network-based conversion platform,
    wherein the network-based conversion platform provides a fee-for-service conversion of text messages to voice memos; and
    wherein the conversion platform applies the set of conversion rules and converts the at least one of the one or more text messages into the voice memo; and
receiving the voice memo from the network-based conversion platform via the wireless network.

11. The computer-readable medium of claim 7, wherein transitioning to the driving mode of operation includes connecting the electronic device to an external speaker system of the vehicle via a short range communication channel.

12. The computer-readable medium of claim 7, wherein one or more of the accessed conversion rules identifies a sender of text messages to the electronic device to be converted into voice memos.

13. An apparatus, comprising:
at least one hardware processor;
at least one speaker coupled to the processor; and
at least one data storage device, coupled to the at least one processor, and storing instructions to be executed by the at least one processor, wherein the instructions comprise;
    monitoring the apparatus to identify a triggering event that triggers a certain mode of operation of the apparatus,
        wherein the triggering event includes a determination that the apparatus is proximate to a vehicle associated with the apparatus;
    transitioning, the apparatus into a driving mode of operation in response to the triggering event,
        wherein the driving mode of operation of the apparatus causes the apparatus to convert message-based communications received by the apparatus into voice memos;
    receiving one or more text messages via a wireless network in communication with the apparatus;
    accessing a set of conversion rules associated with converting message-based communications during the driving mode of operation of the apparatus,
        wherein the conversion rules identify a first time period during the driving mode of operation within which text messages are to be converted to voice memos and identify a second time period during the driving mode of operation within which text messages are not to be converted to voice memos;
    determining, based on the accessed conversion rules, to convert at least one of the received one or more text messages into a voice memo because the at least one of the received one or more text messages was received within the first time period during the driving mode of operation; and
    causing the voice memo to be output via the speaker of the apparatus or a speaker of the vehicle associated with the apparatus.

14. The apparatus of claim 13, further comprising:
receiving, via a microphone coupled to the at least one processor, a reply request to respond to the voice memo output via the speaker;
recording, via the microphone, a reply message spoken by a user of the apparatus;
converting the reply message received via the microphone to a text message; and
transmitting, via the wireless network, the text message from the apparatus to one or more recipients.

15. The apparatus of claim 13, wherein the apparatus includes a conversion application that uses the at least one processor of the apparatus to apply the set of conversion rules and convert the at least one of the one or more text messages into the voice memo.

16. The apparatus of claim 13, further comprising:
sending, via a wireless network, the one or more text messages from the apparatus to a network-based conversion platform,
    wherein the network-based conversion platform provides a fee-for-service conversion of text messages to voice memos; and
    wherein the conversion platform applies the set of conversion rules and converts the at least one of the one or more text messages into the voice memo; and
receiving the voice memo from the network-based conversion platform via the wireless network.

17. The apparatus of claim 13, wherein transitioning to the driving mode of operation includes connecting the apparatus to an external speaker system of the vehicle via a short range communication channel.

18. The apparatus of claim 13, wherein one or more of the accessed conversion rules identifies a sender of text messages to the apparatus to be converted into voice memos.

* * * * *